United States Patent
Chiu et al.

(10) Patent No.: US 8,665,014 B2
(45) Date of Patent: Mar. 4, 2014

(54) I/Q DEMODULATION APPARATUS AND METHOD WITH PHASE SCANNING

(75) Inventors: Huan-Ke Chiu, Hsinchu County (TW); Jia-Hung Peng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 100 days.

(21) Appl. No.: 13/396,603

(22) Filed: Feb. 15, 2012

(65) Prior Publication Data

US 2013/0156135 A1  Jun. 20, 2013

(30) Foreign Application Priority Data

Dec. 16, 2011  (TW) .............................. 100146875 A

(51) Int. Cl.
*H04L 27/22* (2006.01)
(52) U.S. Cl.
USPC ........... 329/310; 329/345; 375/324; 375/332; 375/340
(58) Field of Classification Search
USPC .......... 329/304–310, 345, 346; 341/155–157, 341/166; 375/324, 332, 340
See application file for complete search history.

(56) References Cited

U.S. PATENT DOCUMENTS

| 4,598,589 | A | | 7/1986 | Riley et al. |
| 5,122,758 | A | * | 6/1992 | Tomita ........................... 329/304 |
| 5,396,247 | A | * | 3/1995 | Watanabe et al. ............. 341/157 |
| 6,509,861 | B2 | | 1/2003 | Watanabe |
| 6,771,202 | B2 | * | 8/2004 | Watanabe et al. ............. 341/155 |
| 6,940,443 | B2 | * | 9/2005 | Terazawa et al. ............. 341/157 |
| 7,315,219 | B2 | | 1/2008 | Chiang |
| 7,332,973 | B2 | * | 2/2008 | Lee et al. ........................ 331/25 |
| 7,355,544 | B2 | | 4/2008 | Watanabe |
| 7,366,619 | B2 | * | 4/2008 | Watanabe et al. ............... 702/35 |
| 7,376,400 | B2 | | 5/2008 | Bellaouar et al. |
| 7,545,887 | B2 | | 6/2009 | Watanabe et al. |
| 7,755,530 | B2 | * | 7/2010 | Terazawa et al. ............. 341/157 |
| 7,760,833 | B1 | | 7/2010 | Brunner |

(Continued)

FOREIGN PATENT DOCUMENTS

TW            296512        1/1997

OTHER PUBLICATIONS

Tomov et al., "Compact FPGA-Based Beamformer Using Oversampled 1-bit A/D Converters", IEEE Transactions on Ultrasonics, Ferroelectrics, and Frequency Control, May 2005, pp. 870-880, vol. 52, No. 5.

(Continued)

*Primary Examiner* — Levi Gannon
(74) *Attorney, Agent, or Firm* — Jianq Chyun IP Office

(57) ABSTRACT

An I/Q demodulation apparatus and method with phase scanning are provided. The demodulation apparatus includes a ring oscillator, a first latch unit, a decoding unit, a counter unit, a second latch unit, a first arithmetical unit and a second arithmetical unit. The first latch unit samples phase signals outputted from the ring oscillator. The decoding unit decodes the output of the first latch unit to correspondingly generate fine code of a first, a second, a third and a fourth codes. The counter unit counts the phase signals. The second latch unit samples the output of the counter unit to correspondingly generate coarse code of the first, the second, the third and the fourth codes. The first arithmetical unit performs an addition/subtraction operation by using the first code and the second code. The second arithmetical unit performs the addition/subtraction operation by using the third code and the fourth code.

15 Claims, 7 Drawing Sheets

(56) References Cited

U.S. PATENT DOCUMENTS 7,777,580 B2    8/2010   Dosho et al.
7,825,696 B2    11/2010  Watanabe et al.
8,374,075 B2 *  2/2013   Bogdan .................. 370/210

OTHER PUBLICATIONS

Masuda et al., "All-Digital Quadrature Detection With TAD for Radio-Controlled Clocks/Watches", IEEE Transactions on Circuits and Systems—I: Regular Papers, Feb. 2009, pp. 285-293, vol. 56, No. 2.

Watanabe et al., "An All-Digital Analog-to-Digital Converter With 12-μV/LSB Using Moving-Average Filtering", IEEE Journal of Solid-State Circuits, Jan. 2003, pp. 120-125, vol. 38, No. 1.

Li et al., "Delay-Line-Based Analog-to-Digital Converters", IEEE Transactions on Circuits and Systems—II: Express Briefs, Jun. 2009, pp. 464-468, vol. 56, No. 6.

\* cited by examiner

I/Q DEMODULATION APPARATUS AND METHOD WITH PHASE SCANNING

CROSS-REFERENCE TO RELATED APPLICATION

This application claims the priority benefit of Taiwan application serial no. 100146875, filed on Dec. 16, 2011. The entirety of the above-mentioned patent application is hereby incorporated by reference herein and made a part of this specification.

BACKGROUND

1. Technical Field

The technical field relates to a phase demodulator, and more particularly to a phase demodulator and a phase demodulation method with phase scanning.

2. Related Art

Since a phase demodulator with phase scanning can process the Doppler effect of a moving object so as to extract the related information, the phase demodulator is one of the important technologies that is commonly used in imaging systems (e.g., radars and ultrasounds) as well as tracking systems (e.g., automotive radar and capsule endoscopes). Conventional radar or ultrasonic imaging systems typically adopt a beamforming multi-channel receiver system structure, combined with a powerful operational processor (e.g. a CPU) in the back end. One of the most expensive components in this system is the approximately two meters of cable connecting the terminal transducer (or sensing rod) and the ultrasonic system. This cable includes 8-256 miniature coaxial cables which may cause significant signal decay. Therefore, highly sensitive receivers must be used to achieve the needed dynamic range and to realize the optimal system performance.

However, in order to design the ideal phase demodulation system for future medical usage, the system must be portable and low power, with improved functions, and preferably configured in a handheld apparatus suitable for doctors and home use. How to find the compact and effective circuit is a major subject in the industry.

SUMMARY

The disclosure provides an in-phase/quadrature (I/Q) demodulation apparatus and method with phase scanning, using compact and effective circuit design to implement the digitalization of the circuits.

An exemplary embodiment of the disclosure provides an I/Q demodulation apparatus with phase scanning. The I/Q demodulation apparatus includes a ring oscillator, a first latch unit, a decoding unit, a counter unit, a second latch unit, a first arithmetical unit, and a second arithmetical unit. The ring oscillator outputs a plurality of phase signals of different phases. The phase signals are grouped into a plurality of signal groups. The time delays of the phase signals correspond to an input voltage. The first latch unit is coupled to the ring oscillator to sample the phase signals and output a plurality of latch results corresponding to the signal groups. The decoding unit is coupled to the first latch unit to respectively decode the latch results, and to output a plurality of fine codes of a plurality of codes corresponding to the latch results. The counter unit is coupled to the ring oscillator to respectively select a target phase signal from each of the signal groups, and to respectively count the target phase signals so as to output a plurality of counting results corresponding to the signal groups. The second latch unit is coupled to the counter unit, and the second latch unit samples the counting results so as to output coarse codes of the plurality of codes corresponding to the counting results. The first arithmetical unit and the second arithmetical unit are coupled to the decoding unit and the second latch unit. The first arithmetical unit uses a portion of the plurality of codes to perform an addition/subtraction operation so as to output an in-phase signal. The second arithmetical unit uses another portion of the plurality of codes to perform an addition/subtraction operation so as to output a quadrature signal.

An exemplary embodiment of the disclosure provides an I/Q demodulation method with phase scanning. The I/Q demodulation method includes providing a plurality of phase signals of different phases by using a ring oscillator, in which the time delays of the phase signals correspond to an input voltage; grouping the phase signals into a plurality of signal groups; respectively sampling the phase signals by using a first latch unit, so as to obtain a plurality of latch results corresponding to the signal groups; respectively decoding the latch results of the signal groups by using a decoding unit, so as to obtain fine codes of a plurality of codes corresponding to the latch results; respectively selecting a target phase signal from each of the signal groups; respectively counting the target phase signals by using a counter unit to output a plurality of counting results corresponding to the signal groups; respectively sampling the counting results by using a second latch unit, so as to output coarse codes of the plurality of codes corresponding to the counting results; performing an addition/subtraction operation with a first arithmetical unit using a portion of the plurality of codes, so as to output an in-phase signal; and performing an addition/subtraction operation with a second arithmetical unit using another portion of the plurality of codes, so as to output a quadrature signal.

In summary, exemplary embodiments of the disclosure generate a plurality of phase signals by using the ring oscillator, in which the phase signals are divided into a plurality of signal groups. For example, in some embodiments, the phase signals are grouped into four groups of $I^+$, $Q^+$, $I^-$, and $Q^-$, and the reciprocals of the time delays between adjacent phases are positively related to the amplitude of the analog input voltage. The outputs of the ring oscillator are respectively sampled by four sets of latch units, and then converted by the decoding unit into fine codes of the four sets of codes. Meanwhile, the counter unit counts one of the phase signals in the four groups of phase signals $I^+$, $Q^+$, $I^-$, and $Q^-$, and the second latch unit then samples to obtain the coarse codes of the four sets of codes. The first and second arithmetical units perform addition/subtraction operations on the four sets of codes, so as to obtain the digital signals after the I/Q demodulation.

Several exemplary embodiments accompanied with figures are described in detail below to further describe the disclosure in details.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1:
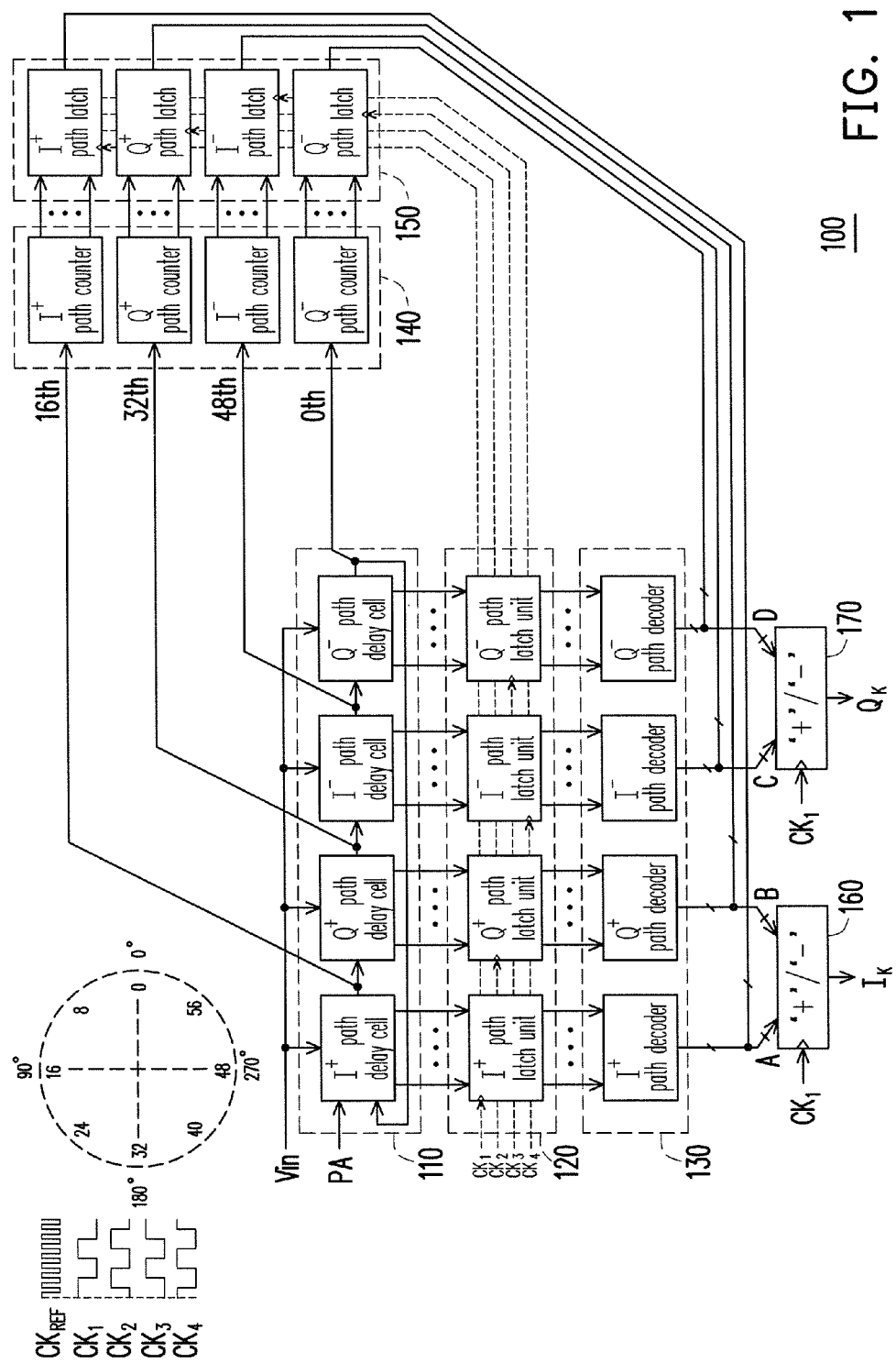
FIG. 1 is a schematic functional block diagram of an I/Q demodulation apparatus with phase scanning according to an exemplary embodiment.

FIG. 1 is a schematic functional block diagram of an in-phase/quadrature (I/Q) demodulation apparatus 100 with phase scanning according to an exemplary embodiment. The I/Q demodulation apparatus 100 includes a ring oscillator 110, a first latch unit 120, a decoding unit 130, a counter unit 140, a second latch unit 150, a first arithmetical unit 160, and a second arithmetical unit 170. In some embodiments, the ring oscillator 110 may be implemented by a plurality of delay cells serially connected to each other. The delay cells are connected to each other in a single ring structure and generate a plurality of phase signals. The time delays of the delay cells correspond to an input voltage Vin. In other embodiments, the ring oscillator 110 is formed by M paths of the same sub-ring oscillators, and these sub-ring oscillators collectively provide a plurality of phase signals. Moreover, M is a multiple of two. For example, the ring oscillator 110 is formed by four of the same sub-ring oscillators, and these sub-ring oscillators collectively provide a plurality of phase signals. The plurality of outputs of these sub-ring oscillators are respectively coupled to each other by different coupling devices, and the delay times of these coupling devices correspond to the input voltage Vin. The coupling devices may be latches, resistor-capacitor (RC) filters, or voltage-controlled delay lines (VCDL), for example. The details of the ring oscillator 110 and the coupling devices are further elaborated on later in the disclosure.

The quantity of the phase signals outputted by the ring oscillator 110 may be set according to a design requirement of an actual product. For example, the ring oscillator 110 outputs 64 phase signals $Q_{00}$-$Q_{63}$ of different phases. The time delays between adjacent phases in the phase signals correspond to the input voltage Vin. For example, the reciprocals of the time delays between adjacent phases are positively related to amplitude of the input voltage Vin.

The phase signals are grouped into a plurality of signal groups. For example, the phase signals may be grouped into an in-phase group ($I^+$ group), an inverse phase group ($I^-$ group), a quadrature phase group ($Q^+$ group), and a quadrature inverse phase group ($Q^-$ group). If the phase signals $Q_0$-$Q_{63}$ are taken as an example, then the $I^+$ group includes the phase signals $Q_0$-$Q_{15}$, the $Q^+$ group includes the phase signals $Q_{16}$-$Q_{31}$, the $I^-$ group includes the phase signals $Q_{32}$-$Q_{47}$, and the $Q^-$ group includes the phase signals $Q_{48}$-$Q_{63}$.

The first latch unit 120 is coupled to the ring oscillator 110 to sample the phase signals and to output a plurality of latch results corresponding to the signal groups. For example, the first latch unit 120 in the present embodiment has an $I^+$ path latch unit, an $I^-$ path latch unit, a $Q^+$ path latch unit, and a $Q^-$ path latch unit. The $I^+$ path latch unit samples the phase signals $Q_0$-$Q_{15}$ of the $I^+$ group. The $I^-$ path latch unit samples the phase signals $Q_{32}$-$Q_{47}$ of the $I^-$ group. The $Q^+$ path latch unit samples the phase signals $Q_{16}$-$Q_{31}$ of the $Q^+$ group. The $Q^-$ path latch unit samples the phase signals $Q_{48}$-$Q_{63}$ of the $Q^-$ group. In the present embodiment, the $I^+$ path latch unit, the $I^-$ path latch unit, the $Q^+$ path latch unit, and the $Q^-$ path latch unit are triggered by a first clock signal $CK_1$, a second clock signal $CK_2$, a third clock signal $CK_3$, and a fourth clock signal $CK_4$ to perform sampling. A frequency of the clock signals $CK_1$, $CK_2$, $CK_3$, and $CK_4$ is the same as a carrier frequency $\omega_0$ of the input voltage Vin. The clock signals $CK_1$, $CK_2$, $CK_3$, and $CK_4$ respectively represent the four phases $I^+$, $Q^+$, $I^-$ and $Q^-$. Phase scanning can be implemented by combining a multi-phase output signal of the ring oscillator 110 with the phase rotation of the clock signals in the first latch unit 120.

The decoding unit 130 is coupled to the first latch unit 120 to respectively decode the latch results of the first latch unit 120, and to output the fine codes of the plurality of codes corresponding to the latch results. In the present embodiment, the codes include a first code A, a second code B, a third code C, and a fourth code D. For example, the decoding unit 130 has an $I^+$ path decoder, an $I^-$ path decoder, a $Q^+$ path decoder, and a $Q^-$ path decoder. The $I^+$ path decoder decodes the output of the $I^+$ path latch unit, and correspondingly generates the fine code of the first code A. The $Q^+$ path decoder decodes the output of the $Q^+$ path latch unit, and correspondingly generates the fine code of the second code B. The $I^-$ path decoder decodes the output of the $I^-$ path latch unit, and correspondingly generates the fine code of the third code C. The $Q^-$ path decoder decodes the output of the $Q^-$ path latch unit, and correspondingly generates the fine code of the fourth code D. In the present embodiment, the decoding unit 130 converts the output of the first latch unit 120 into binary code to serve as the fine codes of the first code A, the second code B, the third code C, and the fourth code D.

The counter unit 140 is coupled to the ring oscillator 110 to respectively select a target phase signal from each of the signal groups, and to respectively count the target phase signals to output a plurality of counting results corresponding to the signal groups. For example, the counter unit 140 respectively selects a last phase signal in the $I^+$ group, the $I^-$ group, the $Q^+$ group, and the $Q^-$ group to serve as the target phase signal. Thereafter, the counter unit 140 respectively counts the target phase signals of the $I^+$ group, the $I^-$ group, the $Q^+$ group, and the $Q^-$ group, and outputs the plurality of counting results corresponding to the signal groups to the second latch unit 150.

In the present embodiment, the counter unit 140 has an $I^+$ path counter, an $I^-$ path counter, a $Q^+$ path counter, and a $Q^-$ path counter. The $I^+$ path counter counts one of the phase signals in the $I^+$ group phase signals $Q_0$-$Q_{15}$, for example the last phase signal $Q_{15}$ of the $I^+$ group. The $Q^+$ path counter counts one of the phase signals in the $Q^+$ group phase signals $Q_{16}$-$Q_{31}$, for example the last phase signal $Q_{31}$ of the $Q^+$ group. The $I^-$ path counter counts one of the phase signals in the $I^-$ group phase signals $Q_{32}$-$Q_{47}$, for example the last phase signal $Q_{47}$ of the $I^-$ group. The $Q^-$ path counter counts one of the phase signals in the $Q^-$ group phase signals $Q_{48}$-$Q_{63}$, for example the last phase signal $Q_{63}$ of the $Q^-$ group. The binary code after counting by the counter unit 140 is transmitted to the second latch unit 150.

The second latch unit 150 is coupled to the counter unit 140 in order to sample the counting results of the counter unit 140 and output the coarse codes of the plurality of codes corresponding to the counting results. In the present embodiment, the second latch unit 150 has an $I^+$ path latch, an $I^-$ path latch, a $Q^+$ path latch, and a $Q^-$ path latch. The $I^+$ path latch samples the output of the $I^+$ path counter according to the triggering of the first clock signal $CK_1$, and the $I^+$ path latch correspondingly generates the coarse code of the first code A. The $Q^+$ path latch samples the output of the $Q^+$ path counter according to the triggering of the second clock signal $CK_2$, and the $Q^+$ path latch correspondingly generates the coarse code of the second code B. The $I^-$ path latch samples the output of the $I^-$ path counter according to the triggering of the fourth clock signal $CK_4$, and the $I^-$ path latch correspondingly generates the coarse code of the third code C. The $Q^-$ path latch samples the output of the $Q^-$ path counter according to the triggering of the third clock signal $CK_3$, and the $Q^-$ path latch correspondingly generates the coarse code of the fourth code D.

By combining the fine codes and the coarse codes, a plurality of digital signals or digital codes can be formed. The first arithmetical unit 160 and the second arithmetical unit 170 are coupled to the decoding unit 130 and the second latch unit 150. The first arithmetical unit 160 uses a portion of the plurality of codes to perform an addition/subtraction operation so as to output an in-phase signal $Q_K$. The second arithmetical unit 170 uses another portion of the plurality of codes to perform an addition/subtraction operation so as to output a quadrature signal $Q_K$. For example, the plurality of codes in the present embodiment includes the first code A, the second code B, the third code C, and the fourth code D. According to the triggering of the first clock signal $CK_1$, the first arithmetical unit 160 uses the first code A and the second code B to perform the addition/subtraction operation so as to output the in-phase signal $I_K$. According to the triggering of the first clock signal $CK_1$, the first arithmetical unit 170 uses the third code C and the fourth code D to perforin the addition/subtraction operation so as to output the quadrature signal $Q_K$. The output signals $I_K$ and $Q_K$ are equivalent to signals after the analog signal Vin is quadrature phase demodulated and passed through an anti-alias filter and an analog-to-digital converter (ADC).

Figure 2A:
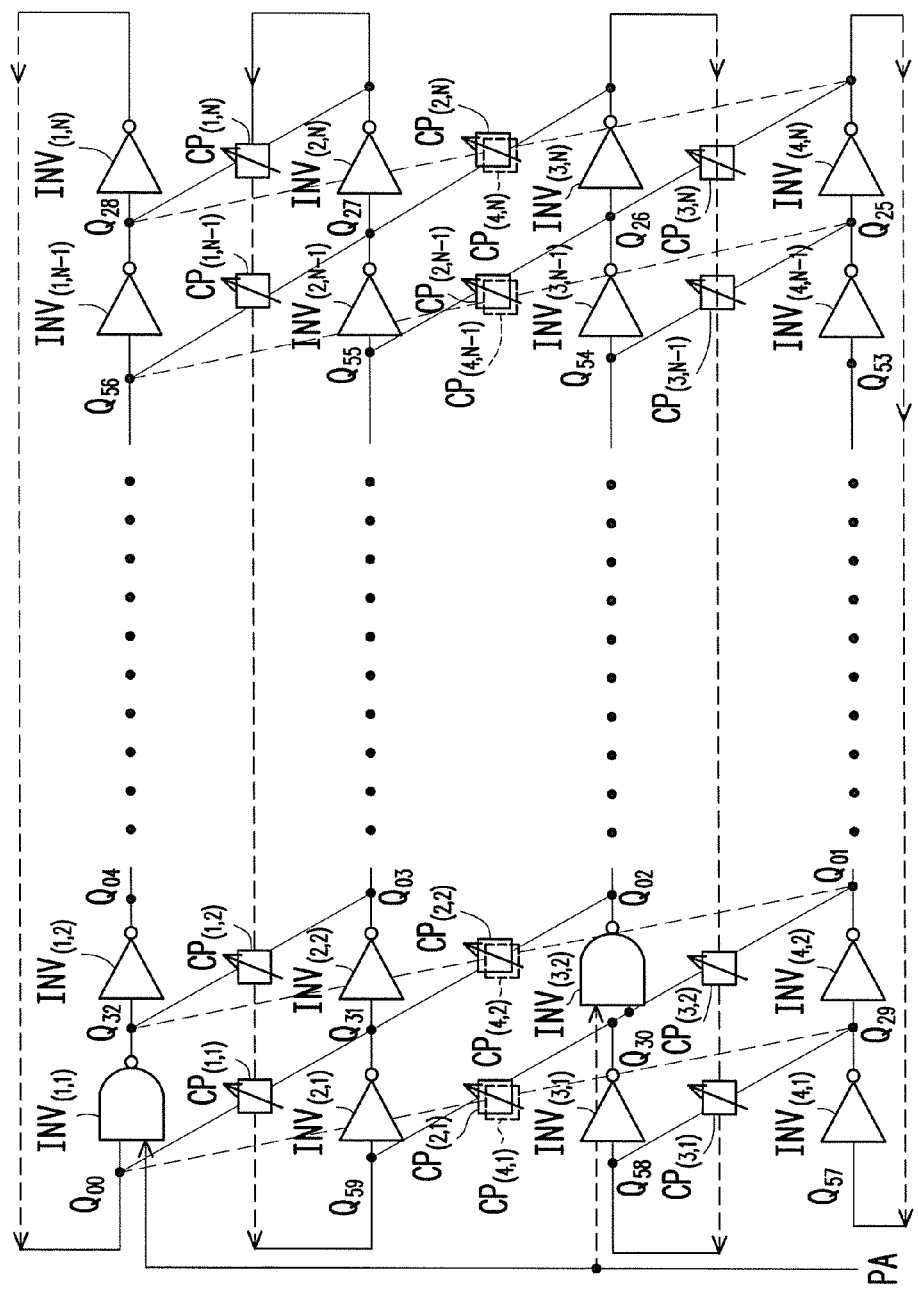
FIG. 2A is a schematic circuit diagram of a ring oscillator depicted in FIG. 1 according to another exemplary embodiment.

FIG. 2A is a schematic circuit diagram of the ring oscillator 110 depicted in FIG. 1 according to another exemplary embodiment. The implementation of the ring oscillator 110 in FIG. 1 can be referred to the description of a ring oscillator 110A depicted in FIG. 2A. Referring to FIG. 2A, the quantity of the phase signals outputted by the ring oscillator 110 may be set according to a design requirement of an actual product. In the present embodiment, the ring oscillator 110A is formed by four paths of sub-ring oscillators, and each of the sub-ring oscillators respectively outputs an odd number of phase signals. For example, each of the sub-ring oscillators respectively outputs 15 phase signals, and the sub-ring oscillators collectively provide a plurality of phase signals $Q_{00}$-$Q_{59}$ of different phases. The plurality of outputs of these sub-ring oscillators are respectively coupled to each other by different coupling devices, and the delay times of these coupling devices correspond to the input voltage Vin.

In the present embodiment, assume N is 15. Referring to FIG. 2A, the ring oscillator 110A includes N first inverters $INV_{(1,1)}$-$INV_{(1,N)}$, N second inverters $INV_{(2,1)}$-$INV_{(2,N)}$, N third inverters $INV_{(3,1)}$-$INV_{(3,N)}$, N fourth inverters $INV_{(4,1)}$-$INV_{(4,N)}$, N first coupling devices $CP_{(1,1)}$-$CP_{(1,N)}$, N second coupling devices $CP_{(2,1)}$-$CP_{(2,N)}$, N third coupling devices $CP_{(3,1)}$-$CP_{(3,N)}$, and N fourth coupling devices $CP_{(4,1)}$-$CP_{(4,N)}$.

The first inverters $INV_{(1,1)}$, $INV_{(1,2)}$, . . . , $INV_{(1,N-1)}$, $INV_{(1,N)}$ form the first sub-ring oscillator. An input terminal of the first inverter $INV_{(1,1)}$ is coupled to an output terminal of the first inverter $INV_{(1,N)}$. The input terminal of the other first inverters $INV_{(1,i)}$ are coupled to the output terminals of the previous first inverters $INV_{(1,i-1)}$, in which $1<i\leq N$. An enable terminal of any one inverter in the first inverters $INV_{(1,1)}$-$INV_{(1,N)}$ is controlled by an enable signal PA. For example, in the present embodiment, the enable terminal of the first inverter $INV_{(1,1)}$ is controlled by the enable signal PA. Any inverter circuit having an enablement controlling function may be used to implement the first inverter $INV_{(1,1)}$, for example by using NAND gates or NOR gates. Moreover, any circuit having an inverting function may be used to implement the other first inverters $INV_{(1,2)}$-$INV_{(1,N)}$, for example by using NOT gates. The first inverters $INV_{(1,1)}$-$INV_{(1,N)}$ of the first sub-ring oscillator respectively provides the phase signals $Q_{32}$, $Q_{04}$, $Q_{36}$, $Q_{08}$, $Q_{40}$, $Q_{12}$, $Q_{44}$, $Q_{16}$, $Q_{48}$, $Q_{20}$, $Q_{52}$, $Q_{24}$, $Q_{56}$, $Q_{28}$, and $Q_{00}$.

The second inverters $INV_{(2,1)}$, $INV_{(2,2)}$, . . . , $INV_{(2,N-1)}$, $INV_{(2,N)}$ form the second sub-ring oscillator. An input terminal of the second inverter $INV_{(2,1)}$ is coupled to an output terminal of the second inverter $INV_{(2,N)}$. The input terminals of the other second inverters $INV_{(2,i)}$ are coupled to the output terminals of the previous second inverters $INV_{(2,i-1)}$. Moreover, any circuit having an inverting function may be used to implement the second inverters $INV_{(2,1)}$-$INV_{(2,N)}$, for example by using NOT gates. The second inverters $INV_{(2,1)}$-$INV_{(2,N)}$ of the second sub-ring oscillator respectively provides the phase signals $Q_{31}$, $Q_{03}$, $Q_{35}$, $Q_{07}$, $Q_{39}$, $Q_{11}$, $Q_{43}$, $Q_{15}$, $Q_{47}$, $Q_{19}$, $Q_{51}$, $Q_{23}$, $Q_{55}$, $Q_{27}$, and $Q_{59}$.

The third inverters $INV_{(3,i)}$, $INV_{(3,2)}$, . . . , $INV_{(3,N-1)}$, $INV_{(3,N)}$ form the third sub-ring oscillator. An input terminal of the third inverter $INV_{(3,1)}$ is coupled to an output terminal of the third inverter $INV_{(3,N)}$. The input terminals of the other third inverters $INV_{(3,i)}$ are coupled to the output terminals of the previous third inverters $INV_{(3,i-1)}$. An enable terminal of any one inverter in the third inverters $INV_{(3,1)}$-$INV_{(3,N)}$ is controlled by the enable signal PA. For example, in the present embodiment, the enable terminal of the third inverter $INV_{(3,2)}$ is controlled by the enable signal PA. Any inverter circuit having an enablement controlling function may be used to implement the third inverter $INV_{(3,2)}$, for example by using NAND gates or NOR gates. Moreover, any circuit having an inverting function may be used to implement the third inverters $INV_{(3,1)}$, $INV_{(3,3)}$-$INV_{(3,N)}$, for example by using NOT gates. The third inverters $INV_{(3,1)}$-$INV_{(3,N)}$ of the third sub-ring oscillator respectively provides the phase signals $Q_{30}$, $Q_{02}$, $Q_{34}$, $Q_{06}$, $Q_{38}$, $Q_{10}$, $Q_{42}$, $Q_{14}$, $Q_{46}$, $Q_{18}$, $Q_{50}$, $Q_{22}$, $Q_{54}$, $Q_{26}$, and $Q_{58}$.

The fourth inverters $INV_{(4,1)}$, $INV_{(4,2)}$, . . . , $INV_{(4,N-1)}$, $INV_{(4,N)}$ form the fourth sub-ring oscillator. An input terminal of the fourth inverter $INV_{(4,1)}$ is coupled to an output terminal of the fourth inverter $INV_{(4,N)}$. The input terminals of the other fourth inverters $INV_{(4,i)}$ are coupled to the output terminals of the previous fourth inverters $INV_{(4,i-1)}$. Moreover, any circuit having an inverting function may be used to implement the fourth inverters $INV_{(4,1)}$-$INV_{(4,N)}$, for example by using NOT gates. The fourth inverters $INV_{(4,1)}$-$INV_{(4,N)}$ of the fourth sub-ring oscillator respectively provides the phase signals $Q_{29}$, $Q_{01}$, $Q_{33}$, $Q_{05}$, $Q_{37}$, $Q_{09}$, $Q_{41}$, $Q_{13}$, $Q_{45}$, $Q_{17}$, $Q_{49}$, $Q_{21}$, $Q_{53}$, $Q_{25}$, and $Q_{57}$.

The first terminals of the first coupling devices $CP_{(1,i)}$ are coupled to the input terminals of the first inverters $INV_{(1,i)}$, and the second terminals of the first coupling devices $CP_{(1,i)}$ are coupled to the output terminals of the second inverters $INV_{(2,i)}$. For example, the first terminal and the second terminal of the first coupling device $CP_{(1,1)}$ are respectively coupled to the input terminal of the first inverter $INV_{(1,1)}$ and the output terminal of the second inverter $INV_{(2,1)}$. The first terminals of the second coupling devices $CP_{(2,i)}$ are coupled to the input terminals of the second inverters $INV_{(2,i)}$, and the second terminals of the second coupling devices $CP_{(2,i)}$ are coupled to the output terminals of the third inverters $INV_{(3,i)}$. For example, the first terminal and the second terminal of the second coupling device $CP_{(2,1)}$ are respectively coupled to the input terminal of the second inverter $INV_{(2,1)}$ and the output terminal of the third inverter $INV_{(3,1)}$. The first terminals of the third coupling devices $CP_{(3,i)}$ are coupled to the input terminals of the third inverters $INV_{(3,i)}$, and the second terminals of the third coupling devices $CP_{(3,i)}$ are coupled to the output terminals of the fourth inverters $INV_{(4,i)}$. For example, the first terminal and the second terminal of the third coupling device $CP_{(3,1)}$ are respectively coupled to the input terminal of the third inverter $INV_{(3,1)}$ and the output terminal of the fourth inverter $INV_{(4,1)}$. The first terminals of the fourth coupling devices $CP_{(4,i)}$ are coupled to the input terminals of the first inverters $INV_{(1,i)}$, and the second terminals of the fourth coupling devices $CP_{(4,i)}$ are coupled to the output terminals of the fourth inverters $INV_{(4,i)}$. For example, the first terminal and the second terminal of the fourth coupling device $CP_{(4,1)}$ are respectively coupled to the input terminal of the first inverter $INV_{(1,1)}$ and the output terminal of the fourth inverter $INV_{(4,1)}$.

Figure 2B:
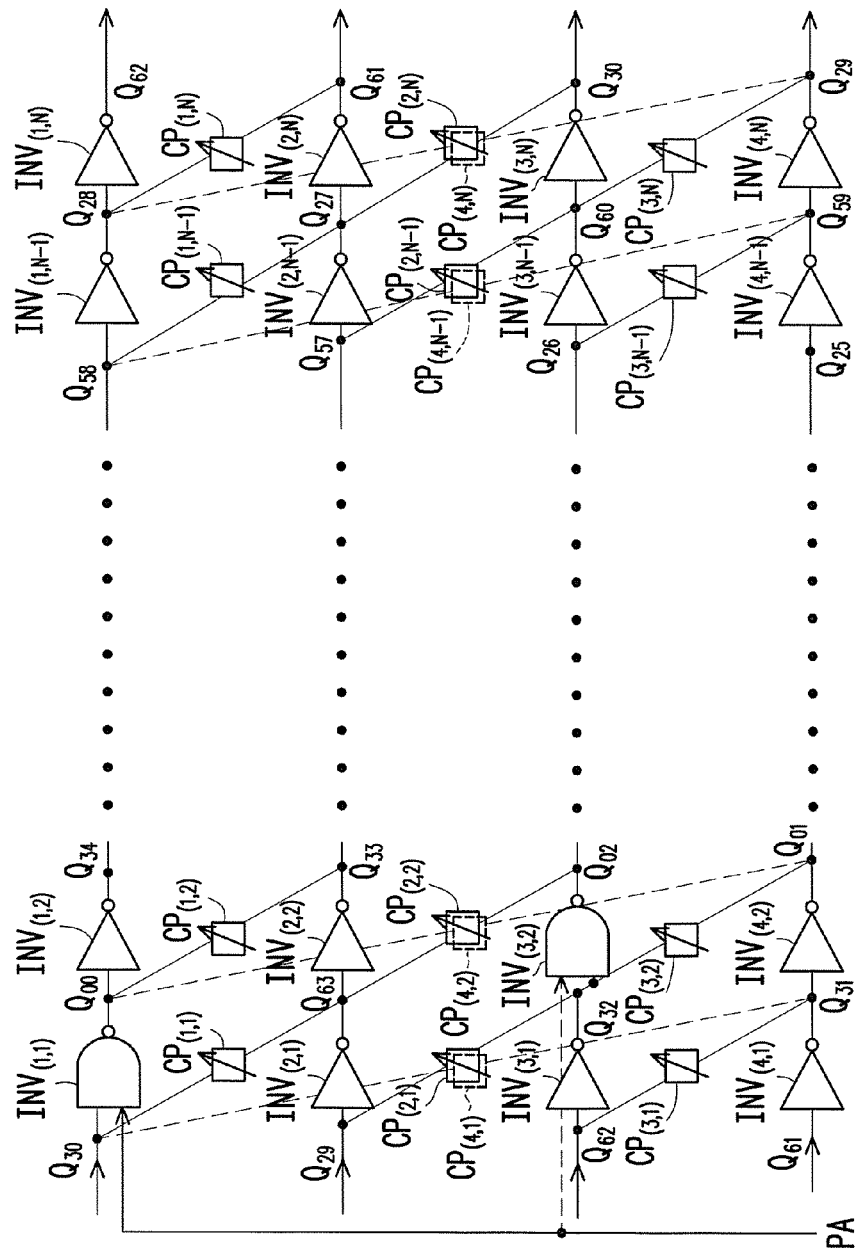
FIG. 2B is a schematic circuit diagram of the ring oscillator depicted in FIG. 1 according to another exemplary embodiment.

FIG. 2B is a schematic circuit diagram of the ring oscillator 110 depicted in FIG. 1 according to another exemplary embodiment. The implementation of the ring oscillator 110 in FIG. 1 can be referred to the description of the ring oscillator 110A depicted in FIG. 2B. Referring to FIG. 2B, the ring oscillator 110A includes N first inverters $INV_{(1,1)}$-$INV_{(1,N)}$, N second inverters $INV_{(2,1)}$-$INV_{(2,N)}$, N third inverters $INV_{(3,1)}$-$INV_{(3,N)}$, N fourth inverters $INV_{(4,1)}$-$INV_{(4,N)}$, N first coupling devices $CP_{(1,1)}$-$CP_{(1,N)}$, N second coupling devices $CP_{(2,1)}$-$CP_{(2,N)}$, N third coupling devices $CP_{(3,1)}$-$CP_{(3,N)}$, and N fourth coupling devices $CP_{(4,1)}$-$CP_{(4,N)}$. The details of the embodiment illustrated in FIG. 2B can be referred to the related description of FIG. 2A. A difference compared to the embodiment depicted in FIG. 2A is that, in the present embodiment, N is an even number (e.g. 16), and the connecting structures of the inverters $INV_{(1,1)}$, $INV_{(2,1)}$, $INV_{(3,1)}$, and $INV_{(4,1)}$ are different. For example, the input terminal of the first inverter $INV_{(1,1)}$ is coupled to the output terminal of the third inverter $INV_{(3,N)}$, the input terminal of the second inverter $INV_{(2,1)}$ is coupled to the output terminal of the fourth inverter $INV_{(4,N)}$, the input terminal of the third inverter $INV_{(3,1)}$ is coupled to the output terminal of the first inverter $INV_{(1,N)}$, and the input terminal of the fourth inverter $INV_{(4,1)}$ is coupled to the output terminal of the second inverter $INV_{(2,N)}$. The connecting structures of the other components of the ring oscillator 110A can be referred to the related description of FIG. 2A.

Therefore, referring to FIG. 2B, the ring oscillator 110A is formed by two paths of sub-ring oscillators, and each of the sub-ring oscillators is formed by two inverter strings, and each of the inverter strings respectively outputs an even number of phase signals. For example, each of the inverter strings respectively outputs 16 phase signals, and the inverter strings collectively provide a plurality of phase signals $Q_{00}$-$Q_{63}$ of different phases. The first inverters $INV_{(1,1)}$-$INV_{(1,N)}$ and the third inverters $INV_{(3,1)}$-$INV_{(3,N)}$ of the first ring oscillator respectively provides the phase signals $Q_{00}$, $Q_{34}$, $Q_{04}$, $Q_{38}$, $Q_{08}$, $Q_{42}$, $Q_{12}$, $Q_{46}$, $Q_{16}$, $Q_{50}$, $Q_{20}$, $Q_{54}$, $Q_{24}$, $Q_{58}$, $Q_{28}$, $Q_{62}$, $Q_{32}$, $Q_{02}$, $Q_{36}$, $Q_{06}$, $Q_{40}$, $Q_{10}$, $Q_{44}$, $Q_{14}$, $Q_{48}$, $Q_{18}$, $Q_{52}$, $Q_{22}$, $Q_{56}$, $Q_{26}$, $Q_{60}$, and $Q_{30}$. Moreover, the second inverters $INV_{(2,1)}$-$INV_{(2,N)}$ and the fourth inverters $INV_{(4,1)}$-$INV_{(4,N)}$ of the second ring oscillator respectively provides the phase signals $Q_{63}$, $Q_{33}$, $Q_{03}$, $Q_{37}$, $Q_{07}$, $Q_{41}$, $Q_{11}$, $Q_{45}$, $Q_{15}$, $Q_{49}$, $Q_{19}$, $Q_{53}$, $Q_{23}$, $Q_{57}$, $Q_{27}$, $Q_{61}$, $Q_{31}$, $Q_{01}$, $Q_{35}$, $Q_{05}$, $Q_{39}$, $Q_{09}$, $Q_{43}$, $Q_{13}$, $Q_{47}$, $Q_{17}$, $Q_{51}$, $Q_{21}$, $Q_{55}$, $Q_{25}$, $Q_{59}$, and $Q_{29}$.

Figure 3:
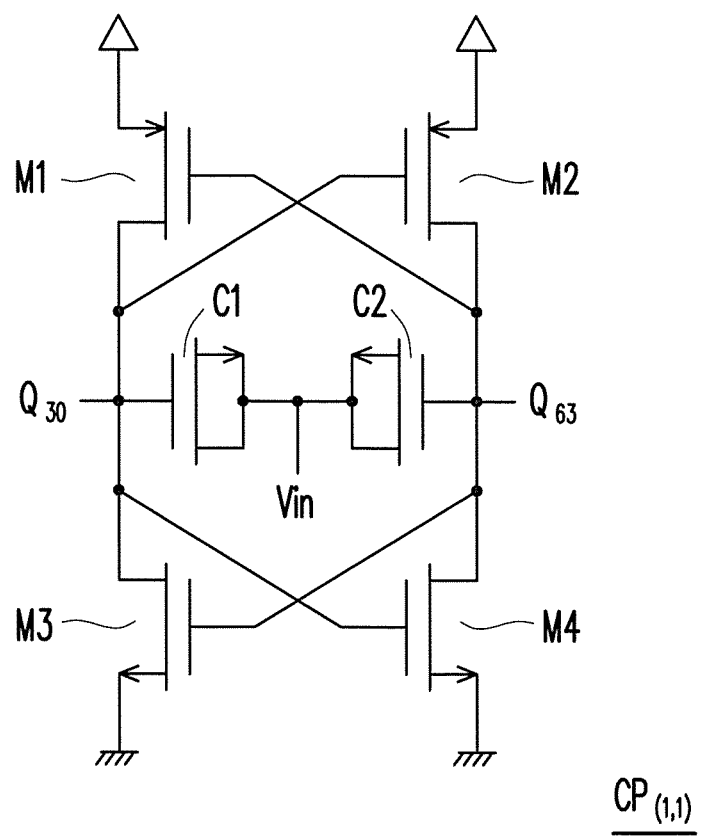
FIG. 3 is a schematic circuit diagram of a coupling device depicted in FIGS. 2A and 2B according to an exemplary embodiment.

By adjusting a power voltage received by the inverters $INV_{(1,1)}$-$INV_{(1,N)}$, $INV_{(2,1)}$-$INV_{(2,N)}$, $INV_{(3,1)}$-$INV_{(3,N)}$, and $INV_{(4,1)}$-$INV_{(4,N)}$ in the ring oscillator 110A, a resolution of the phase demodulation apparatus 100 can be correspondingly adjusted. Moreover, the coupling devices $CP_{(1,1)}$-$CP_{(1,N)}$, $CP_{(2,1)}$-$CP_{(2,N)}$, $CP_{(3,1)}$-$INV_{(3,N)}$, and $CP_{(4,1)}$-$CP_{(4,N)}$ in the present embodiment may be latches with varying delays. FIG. 3 is a schematic circuit diagram of the coupling device $CP_{(1,1)}$ depicted in FIG. 2B according to an exemplary embodiment. The coupling devices illustrated in FIG. 2A and the other coupling devices depicted in FIG. 2B may be implemented by referring to the related description of the coupling device $CP_{(1,1)}$.

Referring to FIG. 3, the coupling device $CP_{(1,1)}$ includes a first transistor M1, a second transistor M2, a third transistor M3, a fourth transistor M4, a first capacitor C1, and a second capacitor C2. In the present embodiment, the transistors M1 and M2 are P-channel metal oxide semiconductor (PMOS) transistors, and the transistors M3 and M4 are N-channel metal oxide semiconductor (NMOS) transistors. The capacitors C1 and C2 are implemented by NMOS transistors, as shown in FIG. 3.

A first terminal (e.g. a source) of the first transistor M1 is coupled to a first voltage (e.g. a system voltage). A second terminal (e.g. a drain) of the first transistor M1 is coupled to the output (i.e. the input of the inverter $INV_{(1,1)}$) of the inverter $INV_{(3,N)}$ in the first sub-ring oscillator, so as to receive the phase signal $Q_{30}$. A first terminal (e.g. a source) of the second transistor M2 is coupled to the first voltage. A second terminal (e.g. a drain) of the second transistor M2 is coupled to a control terminal (e.g. a gate) of the first transistor M1. The drain of the second transistor M2 is also coupled to the input of the inverter $INV_{(2,2)}$ (i.e. the output of the inverter $INV_{(2,1)}$) in the second sub-ring oscillator, so as to receive the phase signal $Q_{63}$. A control terminal (e.g. a gate) of the second transistor M2 is coupled to the second terminal of the first transistor M1.

A first terminal (e.g. a source) of the third transistor M3 is coupled to a second voltage (e.g. a ground voltage). A second terminal (e.g. a drain) of the third transistor M3 is coupled to the second terminal of the first transistor M1. A first terminal (e.g. a source) of the fourth transistor M4 is coupled to the second voltage. A second terminal (e.g. a drain) of the fourth transistor M4 is coupled to a control terminal (e.g. a gate) of the third transistor M3, and the second terminal of the second transistor M2. A control terminal (e.g. a gate) of the fourth transistor M4 is coupled to the second terminal of the third transistor M3. A first terminal of the first capacitor C1 receives the input voltage Vin. A second terminal of the first capacitor C1 is coupled to the second terminal of the first transistor M1. A first terminal of the second capacitor C2 receives the input voltage Vin. A second terminal of the second capacitor C2 is coupled to the second terminal of the second transistor M2. According to a variation of the input voltage Vin, a delay of the coupling device $CP_{(1,1)}$ is correspondingly adjusted.

Figure 4:
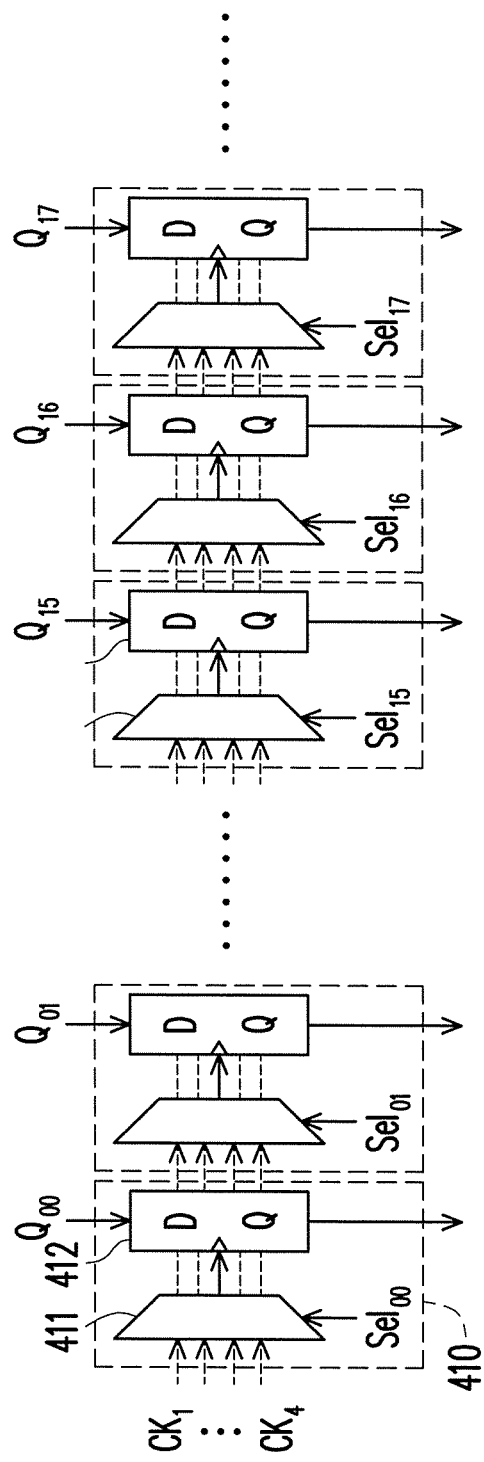
FIG. 4 is a schematic circuit diagram of a first latch unit depicted in FIG. 1 according to an exemplary embodiment.

FIG. 4 is a schematic circuit diagram of the first latch unit 120 depicted in FIG. 1 according to an exemplary embodiment. The first latch unit 120 has a plurality of latch circuits. The latch circuits may be similarly implemented, as shown in FIG. 4. Taking a latch circuit 410 as an example, the latch circuit 410 includes a multiplexer 411 and a latch 412. A first input terminal of the multiplexer 411 receives the first clock signal $CK_1$, a second input terminal of the multiplexer 411 receives the second clock signal $CK_2$, a third input terminal of the multiplexer 411 receives the third clock signal $CK_3$, and a fourth input terminal of the multiplexer 411 receives the fourth clock signal $CK_4$. The multiplexer 411 selects one of the clock signals $CK_1$, $CK_2$, $CK_3$, and $CK_4$ to transmit to the latch 412 according to a control signal $Sel_{00}$. A trigger terminal of the latch 412 is coupled to an output terminal of the multiplexer 411. An input terminal of the latch 412 receives one of the phase signals $Q_{00}$-$Q_{63}$ (e.g. the phase signal $Q_{00}$) of the ring oscillator 110A. An output terminal of the latch 412 is coupled to the decoding unit 130.

When an original phase scan is 0 degrees, the phase signals of the I$^+$ path are sequentially $Q_{01}$-$Q_{16}$. At this time, the corresponding clock signal of the phase signals $Q_{01}$-$Q_{16}$ is $CK_1$, the corresponding clock signal of the phase signals $Q_{17}$-$Q_{32}$ is $CK_2$, the corresponding clock signal of the phase signals $Q_{33}$-$Q_{48}$ is $CK_4$, and the corresponding clock signal of the phase signals $Q_{49}$-$Q_{63}$ and $Q_{00}$ is $CK_3$. Therefore, a portion of the latch circuit in the first latch unit 120 selects to use the clock signal $CK_1$ according to the phase-selected control signals $Sel_{01}$-$Sel_{16}$, and the other paths can be inferred accordingly.

When the phase scan rotates to 5.625 degrees (the next phase scan of the example), the phase signals of the I$^+$ path are sequentially $Q_{02}$-$Q_{17}$. At this time, the corresponding clock signal of the phase signals $Q_{02}$-$Q_{17}$ is $CK_1$, the corresponding clock signal of the phase signals $Q_{18}$-$Q_{33}$ is $CK_2$, the corresponding clock signal of the phase signals $Q_{34}$-$Q_{49}$ is $CK_4$, and the corresponding clock signal of the phase signals $Q_{50}$-$Q_{63}$ and $Q_{00}$-$Q_{01}$ is $CK_3$. Therefore, a portion of the latch circuit in the first latch unit 120 selects to use the clock signal $CK_1$ according to the control signals $Sel_{02}$-$Sel_{17}$, and similarly, the other paths can be inferred accordingly.

Figure 5:
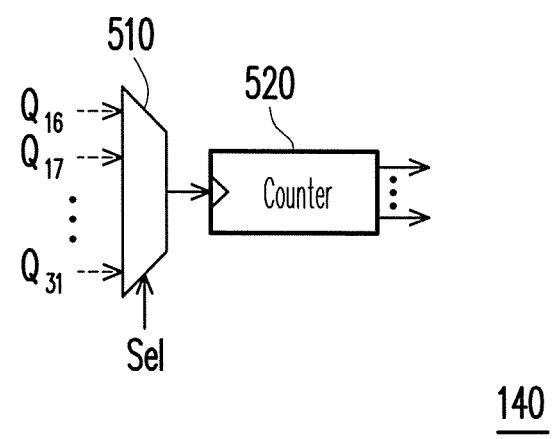
FIG. 5 is a schematic circuit diagram of a counter unit depicted in FIG. 1 according to an exemplary embodiment.

FIG. 5 is a schematic circuit diagram of the first counter unit 140 depicted in FIG. 1 according to an exemplary embodiment. For clarity of description, only the I$^+$ path counter of the counter unit 140 is illustrated in FIG. 5. The Q$^+$ path counter, the I$^-$ path counter, and the Q$^-$ path counter may be implemented by referring to the related description of the I$^+$ path counter depicted in FIG. 5 and inferring from the description accordingly. In the present embodiment, the I$^+$ path counter includes a multiplexer 510 and a counter 520. Each of a plurality of input terminals of the multiplexer 510 receives a target phase signal in the I$^+$ group and a plurality of phase signals in the Q$^+$ group. For example, each of the input terminals of the multiplexer 510 respectively receives the last phase signal $Q_{16}$ of the I$^+$ group phase signals, and the other phase signals $Q_{17}$-$Q_{31}$ in the Q$^+$ group besides the last phase signal $Q_{32}$, as shown in FIG. 5. The multiplexer 510 selects one of the phase signals $Q_{16}$-$Q_{31}$ to transmit to the counter 520 according to a control signal Sel. A trigger terminal of the counter 520 is coupled to an output terminal of the multiplexer 510. An output terminal of the counter 520 is coupled to the I$^+$ path latch of the second latch unit 150.

When an original phase scan is 0 degrees, the phase signals of the I$^+$ path are sequentially $Q_{01}$-$Q_{16}$. The corresponding clock signal of the I$^+$ path latch in the second latch unit 150 is $CK_1$, therefore the corresponding phase signal of the I$^+$ path counter of the counter unit 140 needs to be $Q_{16}$. By analogy, the corresponding phase signal of the Q$^+$ path counter of the counter unit 140 needs to be $Q_{32}$, the corresponding phase signal of the I$^-$ path counter of the counter unit 140 needs to be $Q_{48}$, and the corresponding phase signal of the Q$^-$ path counter of the counter unit 140 needs to be $Q_{00}$. Therefore, the I$^+$ path counter of the counter unit 140 selects to use the phase signal $Q_{16}$ to trigger the counter 520 according to the phase-selected control signal Sel. The other paths can be inferred by analogy.

When the phase scan rotates to 5.625 degrees (the next phase scan of the example), the phase signals of the I$^+$ path are sequentially $Q_{02}$-$Q_{17}$. The corresponding phase signal of the I$^+$ path counter of the counter unit 140 needs to be $Q_{17}$, the corresponding phase signal of the Q$^+$ path counter of the counter unit 140 needs to be $Q_{33}$, the corresponding phase signal of the I$^-$ path counter of the counter unit 140 needs to be $Q_{49}$, and the corresponding phase signal of the Q$^-$ path counter of the counter unit 140 needs to be $Q_{01}$. Therefore, the I$^+$ path counter of the counter unit 140 selects to use the phase signal $Q_{17}$ to trigger the counter 520 according to the phase-selected control signal Sel. Similarly, the other paths can be inferred by analogy.

Figure 6:
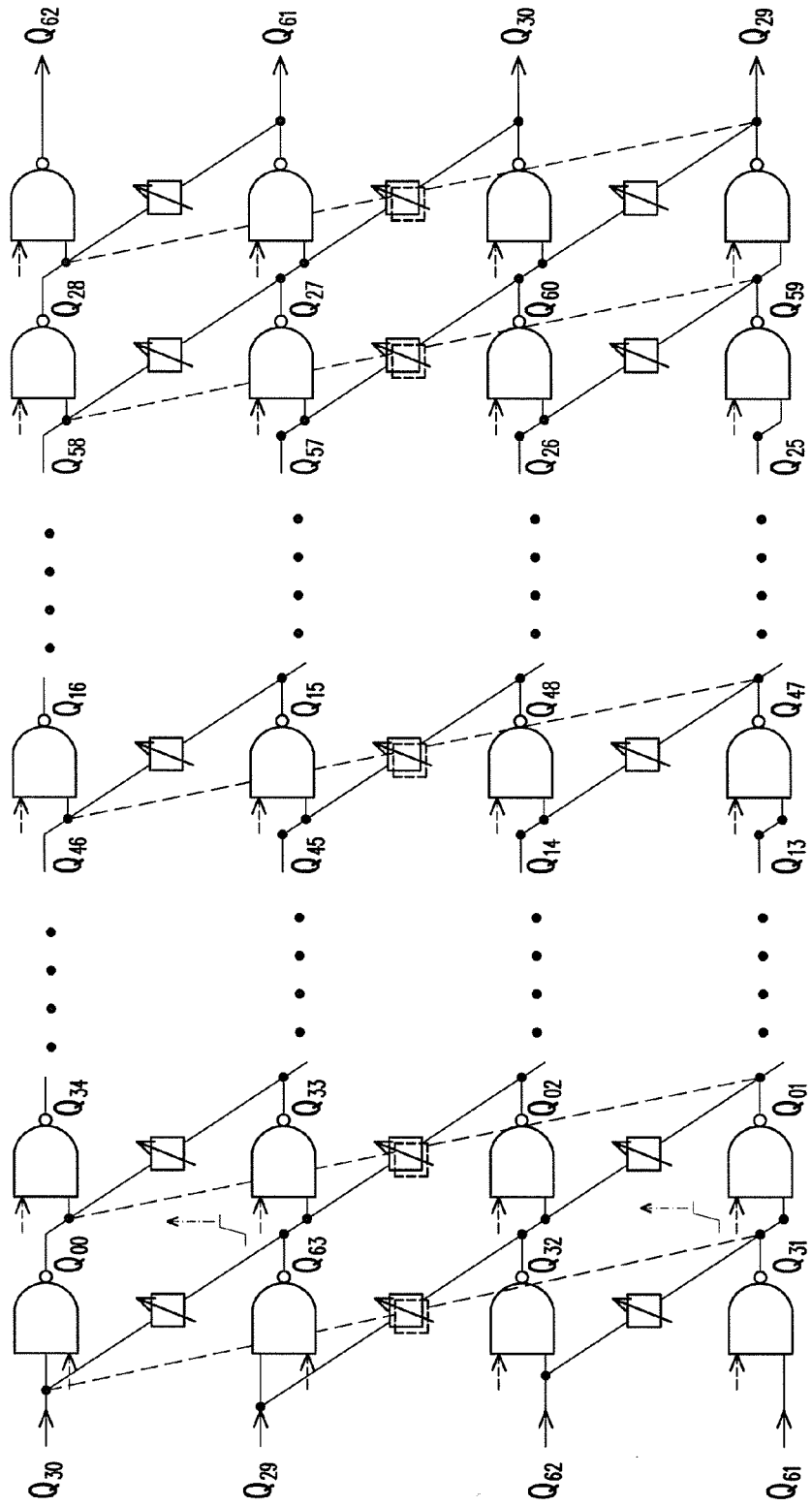
FIG. 6 is a schematic circuit diagram of the ring oscillator depicted in FIG. 1 according to another exemplary embodiment.

FIG. 6 is a schematic circuit diagram of the ring oscillator 110 depicted in FIG. 1 according to another exemplary embodiment. The implementation of the ring oscillator 110 in FIG. 1 can be referred to the description of a ring oscillator 110B depicted in FIG. 6. The details of the embodiment illustrated by FIG. 6 can be referred to the related description of FIGS. 2A, 2B, and 3. A difference compared to the embodiment depicted in FIG. 2B is that, in the embodiment illustrated in FIG. 6 the NOT gates of the two-path ring oscillator are all replaced by NAND gates having two input terminals. One of the input terminal of the NAND gates serves as a pulse trigger terminal (e.g. receives the enable signal PA), and the other input terminal serves as an serially connected input terminal of the ring oscillator. The outputs of the NAND gate are respectively coupled in sequence to the input terminals of the NAND gates of different sub-ring oscillators via the coupling devices. Similar to the embodiment depicted in FIG. 2B, the coupling devices may be latches with delay adjustments, and the power voltage received by the ring oscillator may also be used to adjust the resolution. When an original phase scan is 0 degrees, a pulse respectively triggers NAND gates with outputs of $Q_{01}$ and $Q_{33}$, and the pulse trigger terminals of the other NAND gates are all set to "1". When the phase scan is 5.625 degrees, the pulse is altered to respectively trigger the NAND gates with outputs of $Q_{02}$ and $Q_{34}$, and the pulse trigger terminals of the other NAND gates are all set to "1".

An I/Q demodulation method with phase scanning is described below. The I/Q demodulation method includes providing a plurality of phase signals of different phases by using the ring oscillator 110, in which the time delays of the phase signals correspond to the input voltage Vin; grouping the phase signals into a plurality of signal groups; respectively sampling the phase signals by using the first latch unit, so as to obtain a plurality of latch results corresponding to the signal groups; respectively decoding the latch results of the signal groups by using the decoding unit 130, so as to obtain the fine codes of the plurality of codes corresponding to the latch results; respectively selecting a target phase signal from each of the signal groups; respectively counting the target phase signals by using the counter unit 140 to output a plurality of counting results corresponding to the signal groups; respectively sampling the counting results by using the second latch unit 150, so as to output the coarse codes of the plurality of codes corresponding to the counting results; performing an addition/subtraction operation with the first arithmetical unit 160 using a portion of the plurality of codes, so as to output the in-phase signal $I_K$; and performing an addition/subtraction operation with the second arithmetical unit 170 using another portion of the plurality of codes, so as to output the quadrature signal $Q_K$.

In view of the foregoing, embodiments of the disclosure provide the I/Q demodulation apparatus 100 with phase scanning. The demodulation apparatus 100 with phase scanning may be applied in imaging systems (e.g., radars and ultrasounds) as well as tracking systems (e.g., automotive radar and capsule endoscopes). The demodulation apparatus can process the Doppler effect of a moving object so as to extract the related information. Moreover, the demodulation apparatus 100 may be applied in other medical equipments (e.g., breath monitors and multi-lead electrocardiograms (ECGs)). The demodulation apparatus 100 adopts the ring oscillator 110 having a plurality of phase output signals with pulse-triggered delays, so as to generate four groups of phase signals $I^+$, $Q^+$, $I^-$, and $Q^-$. For example, the reciprocals of the time delays between adjacent phases are positively related to the amplitude of the analog input voltage Vin. The outputs of the ring oscillator 110 pass through four groups of latch units, and the outputs are sampled with quadrature clock signals (having a same frequency $\omega_0$ as the carrier frequency of the input signal Vin). The decoding unit 130 then converts the sampled outputs into binary code to serve as the fine codes. Meanwhile, in the four groups of phase signals $I^+$, $Q^+$, $I^-$, and $Q^-$, the last phase output signal of each group is received by the counter, and the coarse codes in binary code can be obtained by sampling. By combining the fine codes and the coarse codes, and further performing addition/subtraction operations, the demodulated digital signals $I_K$ and $Q_K$ can be obtained. Since the demodulation apparatus 100 has at least a compact circuit design, the final outputs are binary codes from two paths of I/Q phase demodulated signals $I_K$ and $Q_K$, thereby achieving the digitalization of the circuits, with simple conversion manufacturing. Furthermore, the requirements for area, power consumption, and voltage are low, the phase shifts are accurate, and the resolution can be adjusted according to design.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An I/Q demodulation apparatus with phase scanning, comprising:
   a ring oscillator outputting a plurality of phase signals of different phases, wherein the phase signals are grouped into a plurality of signal groups, and time delays of the phase signals correspond to an input voltage;
   a first latch unit coupled to the ring oscillator to sample the phase signals and output a plurality of latch results corresponding to the signal groups, wherein the first latch unit comprises a plurality of path latch units, the path latch units are triggered by different clock signals, and the path latch units one-to-one sample the signal groups, respectively;
   a decoding unit coupled to the first latch unit to respectively decode the latch results, and to output fine codes of a plurality of codes corresponding to the latch results;
   a counter unit coupled to the ring oscillator to respectively select a target phase signal from each of the signal groups, wherein the counter unit comprises a plurality of path counters, the path counters respectively one-to-one count the target phase signals to output a plurality of counting results corresponding to the signal groups;
   a second latch unit coupled to the counter unit to sample the counting results and output coarse codes of the plurality of codes corresponding to the counting results, wherein the second latch unit comprises a plurality of path latches, the path latches are triggered by different clock signals, and the path latches one-to-one sample the counting results, respectively;
   a first arithmetical unit coupled to the decoding unit and the second latch unit, the first arithmetical unit using a portion of the plurality of codes to perform an addition/subtraction operation so as to output an in-phase signal; and
   a second arithmetical unit coupled to the decoding unit and the second latch unit, the second arithmetical unit using another portion of the plurality of codes to perform an addition/subtraction operation so as to output a quadrature phase signal.

2. The I/Q demodulation apparatus as claimed in claim 1, wherein the signal groups comprise an $I^+$ group, an $I^-$ group, a $Q^+$ group, and a $Q^-$ group;
   the plurality of codes comprises a first code, a second code, a third code, and a fourth code;
   the first latch unit has an $I^+$ path latch unit, an $I^-$ path latch unit, a $Q^+$ path latch unit, and a $Q^-$ path latch unit, the $I^+$ path latch unit samples the phase signals of the $I^+$ group, the $I^-$ path latch unit samples the phase signals of the $I^-$ group, the $Q^+$ path latch unit samples the phase signals of the $Q^+$ group, and the $Q^-$ path latch unit samples the phase signals of the $Q^-$ group;
   the decoding unit has an $I^+$ path decoder, an $I^-$ path decoder, a $Q^+$ path decoder, and a $Q^-$ path decoder, the $I^+$ path decoder decodes an output of the $I^+$ path latch unit and correspondingly generates the fine code of the first code, the $Q^+$ path decoder decodes an output of the $Q^+$ path latch unit and correspondingly generates the fine code of the second code, the $I^-$ path decoder decodes an output of the $I^-$ path latch unit and correspondingly generates the fine code of the third code, and the $Q^-$ path decoder decodes an output of the $Q^-$ path latch unit and correspondingly generates the fine code of the fourth code;
   the counter unit has an $I^+$ path counter, an $I^-$ path counter, a $Q^+$ path counter, and a $Q^-$ path counter, the $I^+$ path counter counts a target phase signal in the $I^+$ group, the $Q^+$ path counter counts a target phase signal in the $Q^+$ group, the $I^-$ path counter counts a target phase signal in the $I^-$ group, and the $Q^-$ path counter counts a target phase signal in the $Q^-$ group;
   the second latch unit has an $I^+$ path latch, an $I^-$ path latch, a $Q^+$ path latch, and a $Q^-$ path latch, the $I^+$ path latch samples an output of the $I^+$ path counter and correspondingly generates the coarse code of the first code, the $Q^+$ path latch samples an output of the $Q^+$ path counter and correspondingly generates the coarse code of the second code, the $I^-$ path latch samples an output of the $I^-$ path counter and correspondingly generates the coarse code of the third code, and the $Q^-$ path latch samples an output of the $Q^-$ path counter and correspondingly generates the coarse code of the fourth code;
   the first arithmetical unit uses the first code and the second code to perform the addition/subtraction operation, so as to output the in-phase signal; and
   the second arithmetical unit uses the third code and the fourth code to perform the addition/subtraction operation, so as to output the quadrature signal.

3. The I/Q demodulation apparatus as claimed in claim 2, wherein the $I^+$ path counter comprises:
   a multiplexer, each of a plurality of input terminals of the multiplexer receiving a target phase signal of the $I^+$ group and a plurality of phase signals of the $Q^+$ group; and
   a counter, a trigger terminal of the counter coupled to an output terminal of the multiplexer, and an output terminal of the counter is coupled to the $I^+$ path latch.

4. The I/Q demodulation apparatus as claimed in claim 1, wherein the ring oscillator is formed by four paths of the same sub-ring oscillators, a plurality of outputs of the sub-ring oscillators are respectively coupled to each other by different coupling devices, wherein the delays of the coupling devices correspond to the input voltage.

5. The I/Q demodulation apparatus as claimed in claim 4, wherein the coupling devices are latches, resistor-capacitor (RC) filters, or voltage-controlled delay lines.

6. The I/Q demodulation apparatus as claimed in claim 4, wherein the any one of the coupling devices comprises:
 a first transistor having a first terminal coupled to a first voltage, and a second terminal coupled to one of the plurality of outputs of the sub-ring oscillators;
 a second transistor having a first terminal coupled to the first voltage, a second terminal coupled to a control terminal of the first transistor and another one of the plurality of outputs of the sub-ring oscillators, and a control terminal coupled to the second terminal of the first transistor;
 a third transistor having a first terminal coupled to a second voltage, and a second terminal coupled to the second terminal of the first transistor;
 a fourth transistor having a first terminal coupled to the second voltage, a second terminal coupled to a control terminal of the third transistor and the second terminal of the second transistor, and a control terminal coupled to the second terminal of the third transistor;
 a first capacitor having a first terminal receiving the input voltage, and a second terminal coupled to the second terminal of the first transistor; and
 a second capacitor having a first terminal receiving the input voltage, and a second terminal coupled to the second terminal of the second transistor.

7. The I/Q demodulation apparatus as claimed in claim 1, wherein the ring oscillator is formed by four paths of sub-ring oscillators, and each of the sub-ring oscillators respectively outputs an odd number of phase signals, the ring oscillator comprising:
 N first inverters $INV_{(1,1)}$-$INV_{(1,N)}$, wherein an input terminal of the first inverter $INV_{(1,1)}$ is coupled to an output terminal of the first inverter $INV_{(1,N)}$, an input terminal of the first inverter $INV_{(1,i)}$ is coupled to an output terminal of the first inverter $INV_{(1,i-1)}$, and $1<i\le N$;
 N second inverters $INV_{(2,1)}$-$INV_{(2,N)}$, wherein an input terminal of the second inverter $INV_{(2,1)}$ is coupled to an output terminal of the second inverter $INV_{(2,N)}$, and an input terminal of the second inverter $INV_{(2,i)}$ is coupled to an output terminal of the second inverter $INV_{(2,i-1)}$;
 N third inverters $INV_{(3,1)}$-$INV_{(3,N)}$, wherein an input terminal of the third inverter $INV_{(3,1)}$ is coupled to an output terminal of the third inverter $INV_{(3,N)}$, and an input terminal of the third inverter $INV_{(3,i)}$ is coupled to an output terminal of the third inverter $INV_{(3,i-1)}$;
 N fourth inverters $INV_{(4,1)}$-$INV_{(4,N)}$, wherein an input terminal of the fourth inverter $INV_{(4,1)}$ is coupled to an output terminal of the fourth inverter $INV_{(4,N)}$, and an input terminal of the fourth inverter $INV_{(4,i)}$ is coupled to an output terminal of the fourth inverter $INV_{(4,i-1)}$;
 N first coupling devices $CP_{(1,1)}$-$CP_{(1,N)}$, wherein a first terminal of the first coupling device $CP_{(1,i)}$ is coupled to the input terminal of the first inverter $INV_{(1,i)}$, and a second terminal of the first coupling device $CP_{(1,i)}$ is coupled to the output terminal of the second inverter $INV_{(2,i)}$;
 N second coupling devices $CP_{(2,1)}$-$CP_{(2,N)}$, wherein a first terminal of the second coupling device $CP_{(2,i)}$ is coupled to the input terminal of the second inverter $INV_{(2,i)}$, and a second terminal of the second coupling device $CP_{(2,i)}$ is coupled to the output terminal of the third inverter $INV_{(3,i)}$;
 N third coupling devices $CP_{(3,1)}$-$CP_{(3,N)}$, wherein a first terminal of the third coupling device $CP_{(3,i)}$ is coupled to the input terminal of the third inverter $INV_{(3,i)}$, and a second terminal of the third coupling device $CP_{(3,i)}$ is coupled to the output terminal of the fourth inverter $INV_{(4,i)}$; and
 N fourth coupling devices $CP_{(4,1)}$-$CP_{(4,N)}$, wherein a first terminal of the fourth coupling device $CP_{(4,i)}$ is coupled to the input terminal of the first inverter $INV_{(1,i)}$, and a second terminal of the fourth coupling device $CP_{(4,i)}$ is coupled to the output terminal of the fourth inverter $INV_{(4,i)}$.

8. The I/Q demodulation apparatus as claimed in claim 7, wherein an enable terminal of one of the first inverters $INV_{(1,1)}$-$INV_{(1,N)}$ and an enable terminal of one of the third inverters $INV_{(3,1)}$-$INV_{(3,N)}$ are controlled by an enable signal.

9. The I/Q demodulation apparatus as claimed in claim 1, wherein the ring oscillator is formed by two paths of sub-ring oscillators, and each of the sub-ring oscillators is formed by two inverter strings, and each of the inverter strings respectively outputs an even number of phase signals, the ring oscillator comprising:
 N first inverters $INV_{(1,1)}$-$INV_{(1,N)}$, wherein an input terminal of the first inverter $INV_{(1,i)}$ is coupled to an output terminal of the first inverter $INV_{(1,i-1)}$, and $1<i\le N$;
 N second inverters $INV_{(2,1)}$-$INV_{(2,N)}$, wherein an input terminal of the second inverter $INV_{(2,i)}$ is coupled to an output terminal of the second inverter $INV_{(2,i-1)}$;
 N third inverters $INV_{(3,1)}$-$INV_{(3,N)}$, wherein the input terminal of the first inverter $INV_{(1,1)}$ is coupled to an output terminal of the third inverter $INV_{(3,N)}$, an input terminal of the third inverter $INV_{(3,1)}$ is coupled to an output terminal of the first inverter $INV_{(1,N)}$, and an input terminal of the third inverter $INV_{(3,i)}$ is coupled to an output terminal of the third inverter $INV_{(3,i-1)}$;
 N fourth inverters $INV_{(4,1)}$-$INV_{(4,N)}$, wherein the input terminal of the second inverter $INV_{(2,1)}$ is coupled to an output terminal of the fourth inverter $INV_{(4,N)}$, an input terminal of the fourth inverter $INV_{(4,1)}$ is coupled to an output terminal of the second inverter $INV_{(2,N)}$, and an input terminal of the fourth inverter $INV_{(4,i)}$ is coupled to an output terminal of the fourth inverter $INV_{(4,i-1)}$;
 N first coupling devices $CP_{(1,1)}$-$CP_{(1,N)}$, wherein a first terminal of the first coupling device $CP_{(1,i)}$ is coupled to the input terminal of the first inverter $INV_{(1,i)}$, and a second terminal of the first coupling device $CP_{(1,i)}$ is coupled to the output terminal of the second inverter $INV_{(2,i)}$;
 N second coupling devices $CP_{(2,1)}$-$CP_{(2,N)}$, wherein a first terminal of the second coupling device $CP_{(2,i)}$ is coupled to the input terminal of the second inverter $INV_{(2,i)}$, and a second terminal of the second coupling device $CP_{(2,i)}$ is coupled to the output terminal of the third inverter $INV_{(3,i)}$;
 N third coupling devices $CP_{(3,1)}$-$CP_{(3,N)}$, wherein a first terminal of the third coupling device $CP_{(3,i)}$ is coupled to the input terminal of the third inverter $INV_{(3,i)}$, and a second terminal of the third coupling device $CP_{(3,i)}$ is coupled to the output terminal of the fourth inverter $INV_{(4,i)}$; and
 N fourth coupling devices $CP_{(4,1)}$-$CP_{(4,N)}$, wherein a first terminal of the fourth coupling device $CP_{(4,i)}$ is coupled to the input terminal of the first inverter $INV_{(1,i)}$, and a second terminal of the fourth coupling device $CP_{(4,i)}$ is coupled to the output terminal of the fourth inverter $INV_{(4,i)}$.

10. The I/Q demodulation apparatus as claimed in claim 9, wherein an enable terminal of one of the first inverters $INV_{(1,1)}$-$INV_{(1,N)}$ and an enable terminal of one of the third inverters $INV_{(3,1)}$-$INV_{(3,N)}$ are controlled by an enable signal.

11. The I/Q demodulation apparatus as claimed in claim 1, wherein the first latch unit has a plurality of latch circuits, and each of the latch circuits respectively comprises:
   a multiplexer having a first input terminal receiving a first clock signal, a second input terminal receiving a second clock signal, a third input terminal receiving a third clock signal, and a fourth input terminal receiving a fourth clock signal; and
   a latch having a trigger terminal coupled to an output terminal of the multiplexer, an input terminal receiving one of the phase signals, and an output terminal coupled to the decoding unit.

12. An I/Q demodulation method with phase scanning, comprising:
   providing a plurality of phase signals of different phases by using a ring oscillator, wherein the time delays of the phase signals correspond to an input voltage;
   grouping the phase signals into a plurality of signal groups;
   respectively sampling the phase signals by using a first latch unit, so as to obtain a plurality of latch results corresponding to the signal groups, wherein the first latch unit comprises a plurality of path latch units, the path latch units are triggered by different clock signals, and the path latch units one-to-one sample the signal groups, respectively;
   respectively decoding the latch results of the signal groups by using a decoding unit, so as to obtain fine codes of a plurality of codes corresponding to the latch results;
   respectively selecting a target phase signal from each of the signal groups;
   respectively counting the target phase signals by using a counter unit to output a plurality of counting results corresponding to the signal groups, wherein the counter unit comprises a plurality of path counters, the path counters respectively one-to-one count the target phase signals;
   respectively sampling the counting results by using a second latch unit, so as to output coarse codes of the plurality of codes corresponding to the counting results, wherein the second latch unit comprises a plurality of path latches, the path latches are triggered by different clock signals, and the path latches one-to-one sample the counting results, respectively;
   performing an addition/subtraction operation with a first arithmetical unit using a portion of the plurality of codes, so as to output an in-phase signal; and
   performing an addition/subtraction operation with a second arithmetical unit using another portion of the plurality of codes, so as to output a quadrature signal.

13. The I/Q demodulation method as claimed in claim 12, wherein the signal groups comprise an $I^+$ group, an $I^-$ group, a $Q^+$ group, and a $Q^-$ group;
   the plurality of codes comprise a first code, a second code, a third code, and a fourth code;
   the first latch unit has an $I^+$ path latch unit, an $I^-$ path latch unit, a $Q^+$ path latch unit, and a $Q^-$ path latch unit, the $I^+$ path latch unit samples the phase signals of the $I^+$ group, the $I^-$ path latch unit samples the phase signals of the $I^-$ group, the $Q^+$ path latch unit samples the phase signals of the $Q^+$ group, and the $Q^-$ path latch unit samples the phase signals of the $Q^-$ group;
   the decoding unit has an $I^+$ path decoder, an $I^-$ path decoder, a $Q^+$ path decoder, and a $Q^-$ path decoder, the $I^+$ path decoder decodes an output of the $I^+$ path latch unit and correspondingly generates the fine code of the first code, the $Q^+$ path decoder decodes an output of the $Q^+$ path latch unit and correspondingly generates the fine code of the second code, the $I^-$ path decoder decodes an output of the $I^-$ path latch unit and correspondingly generates the fine code of the third code, and the $Q^-$ path decoder decodes an output of the $Q^-$ path latch unit and correspondingly generates the fine code of the fourth code;
   the counter unit has an $I^+$ path counter, an $I^-$ path counter, a $Q^+$ path counter, and a $Q^-$ path counter, the $I^+$ path counter counts a target phase signal in the $I^+$ group, the $Q^+$ path counter counts a target phase signal in the $Q^+$ group, the $I^-$ path counter counts a target phase signal in the $I^-$ group, and the $Q^-$ path counter counts a target phase signal in the $Q^-$ group;
   the second latch unit has an $I^+$ path latch, an $I^-$ path latch, a $Q^+$ path latch, and a $Q^-$ path latch, the $I^+$ path latch samples an output of the $I^+$ path counter and correspondingly generates the coarse code of the first code, the $Q^+$ path latch samples an output of the $Q^+$ path counter and correspondingly generates the coarse code of the second code, the $I^-$ path latch samples an output of the $I^-$ path counter and correspondingly generates the coarse code of the third code, and the $Q^-$ path latch samples an output of the $Q^-$ path counter and correspondingly generates the coarse code of the fourth code;
   the first arithmetical unit uses the first code and the second code to perform the addition/subtraction operation, so as to output the in-phase signal; and
   the second arithmetical unit uses the third code and the fourth code to perform the addition/subtraction operation, so as to output the quadrature signal.

14. The I/Q demodulation method as claimed in claim 12, wherein the ring oscillator is formed by M paths of the same sub-ring oscillators, M is a multiple of 2, and a plurality of outputs of the sub-ring oscillators are respectively coupled to each other by different coupling devices, wherein the delays of the coupling devices correspond to the input voltage.

15. The I/Q demodulation method as claimed in claim 14, wherein the coupling devices are latches, RC filters, or voltage-controlled delay lines.

\* \* \* \* \*